United States Patent [19]

Brandenstein et al.

[11] 4,387,938
[45] Jun. 14, 1983

[54] ROLLING BEARING INCORPORATING DAMPING MEANS

[75] Inventors: Manfred Brandenstein, Eusenheim; Horst M. Ernst, Eltingshausen; Lothar Walter, Schweinfurt, all of Fed. Rep. of Germany

[73] Assignee: SKF Kugellagerfabriken GmbH, Schweinfurt, Fed. Rep. of Germany

[21] Appl. No.: 245,278

[22] Filed: Mar. 19, 1981

[30] Foreign Application Priority Data

Mar. 28, 1980 [DE]  Fed. Rep. of Germany ....... 8008532

[51] Int. Cl.³ ...................... F16C 27/04; F16C 33/60; F16C 33/76
[52] U.S. Cl. ............................ 308/184 R; 308/187.2; 308/189 A; 308/196
[58] Field of Search ............ 308/184 R, 187.2, 189 A, 308/196, 216

[56] References Cited

U.S. PATENT DOCUMENTS

| 1,305,131 | 5/1919 | Leon | 308/184 R |
| 1,557,848 | 10/1925 | Kirner | 308/184 R |
| 3,099,073 | 7/1963 | Olson | 308/216 |
| 3,224,821 | 12/1965 | Barr | 308/196 |
| 3,336,057 | 8/1967 | Bloomquist | 308/216 |
| 3,512,855 | 5/1970 | Robinson | 308/184 R |
| 3,552,812 | 1/1971 | Howe, Jr. | 308/189 A |
| 3,640,591 | 2/1972 | Eklund | 308/184 R |
| 3,801,171 | 4/1974 | Rozentals | 308/184 R |

FOREIGN PATENT DOCUMENTS

| 627794 | 2/1963 | Belgium | 308/184 R |
| 1085224 | 9/1967 | United Kingdom | 308/184 R |

Primary Examiner—Richard R. Stearns
Attorney, Agent, or Firm—Eugene E. Renz, Jr.

[57] ABSTRACT

A rolling bearing assembly comprising at least a pair of race rings having confronting spaced raceways and a plurality of rolling elements in the annular space between the race rings and elastically flexible damping means comprising an elastic damping element mounted in at least one recess in the annular portion of at least one of the rings defining the raceway, said damping element projecting slightly into the area of the raceway to frictionally engage the rolling elements and provide a predetermined resistance to rolling.

3 Claims, 4 Drawing Figures

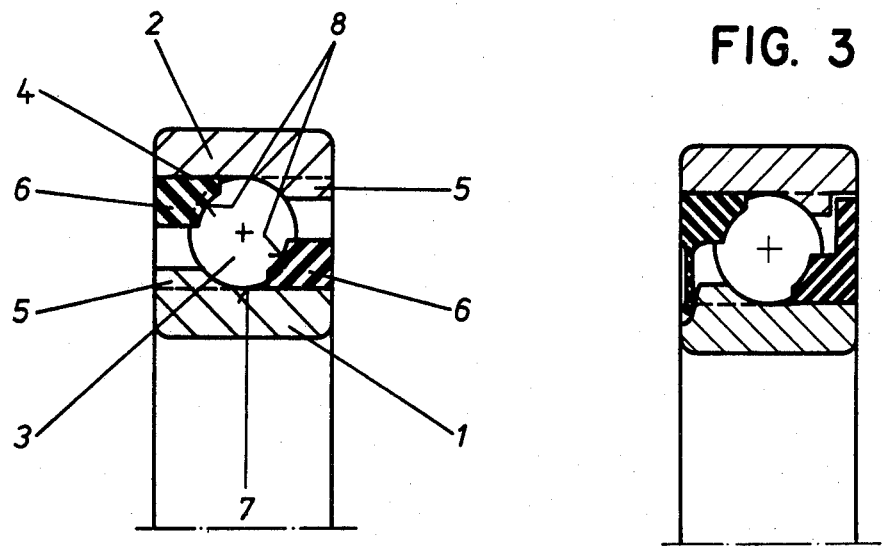
FIG. 1
FIG. 3
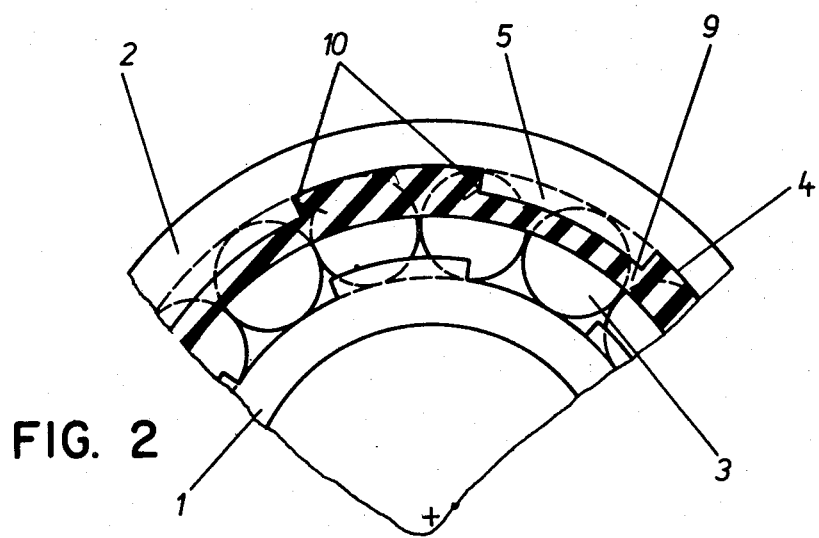
FIG. 2

ROLLING BEARING INCORPORATING DAMPING MEANS

BACKGROUND AND SUMMARY OF THE INVENTION

The present invention relates to rolling bearings and more particularly to ball bearings incorporating a damping means in the form of an elastically flexible element in at least one of the race rings which the rolling elements engage to produce a predetermined resistance to rolling.

Rolling bearings of the above type are used in applications where it is desirable to eliminate or minimize greatly chattering noises and other undesirable phenomena which occur as a result of radial play in the rolling bearing. Bearings of this type are typically used, for example, in automotive applications or assemblies in spring and steering suspensions. Bearings of this type are also used in machines wherein rotary vibrations superimposed on the rotary movement produce annoying effects but where an increased roller resistance can be tolerated. A typical example of a bearing of this type is in the support for printing rolls.

Rolling bearings with increased rolling element resistance are not new per se. An example of such a bearing is shown in German Pat. No. 932,942. In accordance with this arrangement, grooves are machined in the raceway and an elastic ring is inserted in the groove which slightly projects above the raceway. Accordingly, the rolling elements are subjected to a predetermined squeezing action resulting in an increased roller resistance.

These assemblies are considerably more expensive to manufacture by reason of the fact that the rings must be machined to provide the grooves. Furthermore, the raceway is weakened particularly in relation to radial loading as a result of which the application areas are severely limited compared with standard bearings of the same size and consequently larger assemblies must be used. An additional disadvantage of these known rolling bearing constructions is that during operation, the inserted elastic ring tends to elongate by reason of the squeezing action and thus the elastic ring can be transported or carried along by the rolling elements. Consequently, the bearing prematurely looses its function or even in some instances fails.

With the above in mind, it is an object of the present invention to provide a rolling bearing of the above mentioned type which eliminates the above noted disadvantages. As illustrated, the bearing comprises a pair of metal bearing rings having raceways formed therein, a plurality of rolling elements, such as balls, in the annular space between the raceways, at least one of the rings having a shoulder interrupted by at least one recess and an elastic damping element anchored in the recess having a face portion projecting into the raceway area.

Bearing races for rolling bearing in accordance with the present invention which incorporates the damping elements can be simply and inexpensively produced by shaping without machining. The recesses in the raceway shoulders or projections are filled with an elastic material such as rubber in such a way that the damping element projects into the raceway area. In this manner damping and consequent resistance of the rolling element can be simply adapted to the requirements for a given application either by variation in the degree of projection of the damping element into the raceway area or by the elastic properties of the material itself. A strong bond between the elastic damping elements and the metal of the raceways can be achieved by vulcanizing or the like. It is noted, however, the actual anchoring of the damping element is achieved by the pocket-like recesses in the annular projections defined by the raceways of the rings. Further, the damping element is frontally pressed in a peripheral direction against an axial end face or surface of shoulder sections by the roller friction as a result of which movement of the damping elements in the direction of rotation is practically excluded. Consequently, the damping element retains its full effectiveness over the entire operational life of the rolling bearing. If desired, several longer or shorter damping elements can be distributed over the periphery of the bearing. In accordance with the construction and arrangement of the damping elements, the rolling bodies or balls do not exert a rolling squeeze on the elastic material of the damping element as a result of the lateral arrangement thereof but slide along the elastic material by friction. As a result, the degree of projection of the damping elements into the raceway can be substantially reduced for a predetermined required roller resistance compared to the squeezing type construction of the prior known assemblies discussed above. Furthermore, roller resistance is produced which is practically independent of the speed of rotation of the rolling elements relative to the raceway. This is particularly important in achieving the desired resistance action from start up or stand still. In other words, in accordance with the present invention, the starting torque is substantially the same as during bearing rotation. This is particularly advantageous and important in certain environments such as suspension in automotive applications.

Other advantages of the present invention include the fact that the raceways do not require special machining or preparation for installation of the damping elements. As a result, rolling bearing with damping means in accordance with the present invention can be loaded to the same degree as the undamped standard construction. A further advantage is provided in the fabrication and the bearing mounting of the race rings. Since there is no difference except for the damping element between races for standard and damped constructions, they can be jointly produced and stored and when needed the races of the standard construction can then be provided with damping elements.

In accordance with a further feature of the present invention, at least one of the race rings has pockets or recesses provided in both shoulders on either side of the raceway. This produces a uniform damping action over the entire extent of the raceway so that all rolling elements can uniformly contribute to the total roller resistance.

Another feature of the present invention is the provision of a rolling bearing assembly incorporating damping means wherein the damping elements are interconnected by a closed, continuous annular member. In this sense the damping elements located in the pockets or recesses are connected by means of the shoulder section of the bearing race with the same elastic material so that a continuous uninterrupted closed damping ring is obtained. This produces additional friction surfaces for the rolling bodies and facilitates an approved fastening of the elastic damping assembly to the metal race ring.

If desired, auxiliary fastening means can be provided for the damping elements or damping rings. For example, small openings or grooves may be formed in the pockets or recesses in the race rings in the contact area between the elastic material which results in the provision of anchor points.

DESCRIPTION OF THE DRAWING

These and other objects of the present invention and the various features and details of the operation and construction thereof are hereinafter more fully set forth with reference to the accompanying drawing, wherein:

FIG. 1 is a longitudinal sectional view of a ball bearing constructed in accordance with the present invention which incorporates damping means;

FIG. 2 is a fragmentary sectional view showing a modification of the damping means in accordance with the present invention;

FIG. 3 is a sectional view similar to FIG. 1 showing a further modified arrangement in accordance with the present invention;

DESCRIPTION OF PREFERRED EMBODIMENTS

Figure 4:
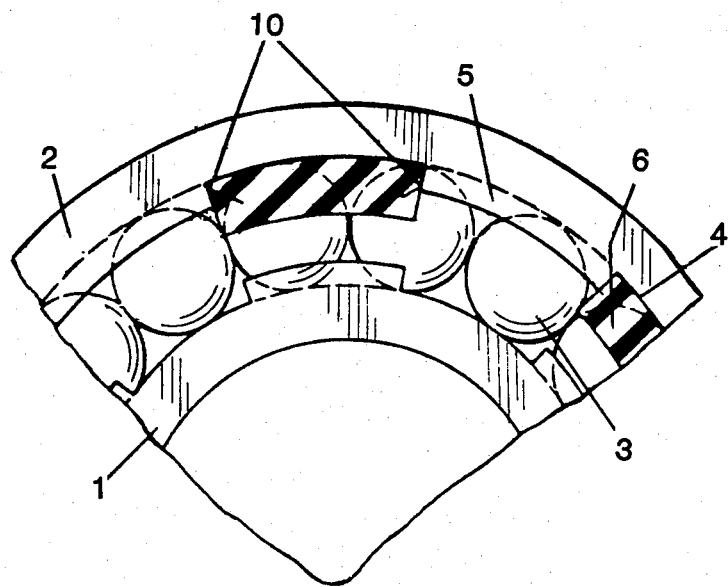
FIG. 4 is a fragmentary side elevational view of the rolling bearing showing the discrete circumferentially spaced damping elements of the bearing assembly as shown in FIG. 1.

Referring now to the drawing and particularly FIG. 1 thereof, there is shown a ball bearing assembly incorporating damping means in accordance with the present invention. The assembly includes an inner race ring 1, an outer race ring 2, which have confronting arcuate raceways 1a, 2a conforming generally to the contour of the rolling elements, in the present instance, a complement of balls 3. As illustrated, the inner and outer raceways, 1a and 2a are defined by circumferentially extending, axially spaced projections or shoulder sections 5 which are interrupted at circumferentially spaced location by recesses or pockets 4. Damping means, in the form of a series of damping elements 6 are mounted or imbedded in the recesses 4 which as illustrated have a contoured arcuate face 8 conforming generally to the contour or profile of the raceways and projecting slightly inwardly thereof in the rolling path of the balls. The damping elements are firmly connected at their contact surfaces with the race rings by vulcanization or by other suitable type fastening means. By this arrangement, as the inner race ring for example rotates in relation to the outer race ring, the balls 3 run on the metallic surface of the raceways 1a, 2a and rub against the contact faces 8 of the damping elements producing an increased roller resistance. For purposes of illustration and clarity, the projection of the faces 8 of the damping elements 6 which project into the raceways has been exaggerated. In a practical application, the contour face 8 of the damping elements project inwardly beyond the contour of the raceways about 0.2 mm. This may be selectively varied depending on the roller resistance action desired.

There is illustrated in FIG. 2 a modified form of the damping means for rolling bearing in accordance with the present invention. In this instance, the damping means consisted of annular members or rings 9 which have an annular body portion 9a and radially outwardly directed projection 9b which seat in the recesses 4 and are firmly connected with the outer race at the contact surface by, for example, vulcanizing. The axial surfaces 10 of the shoulder section 5 in addition to the vulcanized connection prevent movement of the damping rings 9 in the direction of rotation. Each damping ring has an inner face confronting the rolling elements which is contoured in the same manner as the damping elements shown in FIG. 1 and this arcuate face projects slightly into the raceway so that the balls rub against the arcuate face of the damping ring to produce the increased roller resistance. Even though the embodiment of FIG. 2 shows a pair of continuous damping rings in the outer race, the inner ring can also be provided with similar damping rings.

Even though particular embodiments of the present invention have been illustrated and described herein, it is not intended to limit the invention and changes and modifications can be made therein within the scope of the appended claims. For example, the damping arrangement has been shown and described in connection with ball bearings. It is to be understood, however, that the concept has useful application in other types of bearing assemblies, for example, roller bearings.

Additionally, it is possible to form the continuous elastic damping rings illustrated in FIG. 2 so that they have a feathered flexible projection 12 that engages the land surface of the opposing ring thereby providing a seal for the bearing on opposite axial ends on either or both sides of the rolling elements as illustrated in FIG. 3. If desired, the projection at one axial end may terminate short of the opposing ring in the manner shown at the left axial end of the assembly of FIG. 3.

What is claimed is:

1. A rolling bearing assembly comprising at least a pair of race rings having confronting spaced raceways and a plurality of rolling elements in the annular space between the race rings and a plurality of elastically flexible discrete damping elements mounted at circumferentially spaced locations in at least one of the race rings, each damping element anchored against rotation in a recess in an annular radially projecting shoulder of said one ring defining the raceway, said damping elements projecting a predetermined distance into the area of the raceway to frictionally engage the rolling elements and provide a predetermined resistance to rolling.

2. A rolling bearing assembly comprising at least a pair of race rings having confronting spaced raceways and a plurality of rolling elements in the annular space between the race rings and elastically flexible damping means comprising a plurality of elastic damping elements projecting a predetermined distance into the area of the raceway to frictionally engage the rolling elements and provide a predetermined resistance to rolling, said damping elements being anchored against rotation in axially extending recesses formed in an annular radially projecting shoulder of at least one of the rings defining the raceway providing a positive locking of the damping elements against movement circumferentially relative to the ring and wherein said damping elements are interconnected to form a continuous annular member having a projection engaging the opposing ring to provide a seal.

3. A rolling bearing assembly as claimed in claim 2 wherein said annular radially projecting shoulder has a series of circumferentially spaced recesses within which the damping elements engage and are anchored.

* * * * *